(12) United States Patent
Wang et al.

(10) Patent No.: US 6,607,850 B2
(45) Date of Patent: Aug. 19, 2003

(54) HARD STEEL ARTICLES

(75) Inventors: Yumin Wang, Ithaca, NY (US);
Yoshito Hanayama, Ithaca, NY (US);
Doug Fornell, Ithaca, NY (US);
Naosumi Tada, Nabari (JP); Kunihiko Mishima, Nabari (JP)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/281,587

(22) Filed: Oct. 28, 2002

(65) Prior Publication Data

US 2003/0104255 A1 Jun. 5, 2003

Related U.S. Application Data

(62) Division of application No. 09/891,703, filed on Jun. 26, 2001.
(60) Provisional application No. 60/214,965, filed on Jun. 29, 2000, provisional application No. 60/215,050, filed on Jun. 29, 2000, and provisional application No. 60/215,129, filed on Jun. 29, 2000.

(51) Int. Cl.⁷ .............................................. C16G 13/06
(52) U.S. Cl. ..................... 428/698; 59/901; 75/235; 75/239; 148/319; 248/309.2; 428/217; 428/472; 428/699
(58) Field of Search ............................. 428/698, 699, 428/472, 217; 75/235, 239; 59/901; 248/309.2; 148/319

(56) References Cited

U.S. PATENT DOCUMENTS 1,496,979 A 6/1924 Corning
1,773,793 A 8/1930 Sattler
3,907,553 A 9/1975 Nagumo et al.
4,224,060 A 9/1980 De Souza et al.
4,842,818 A 6/1989 Kato et al.
4,863,515 A * 9/1989 Roberts et al.
4,902,473 A 2/1990 Arata et al.
5,013,525 A 5/1991 Hamada et al.
5,435,827 A * 7/1995 Wisell
5,944,920 A 8/1999 Fukushima
6,068,568 A 5/2000 Kozakura et al.
6,213,474 B1 * 4/2001 Sameshima et al.

FOREIGN PATENT DOCUMENTS

| GB | 2137123 | * 10/1984 |
| JP | 53-130713 | * 11/1978 |
| JP | 01-165417 | * 6/1989 |
| JP | 06-270012 | * 9/1994 |

* cited by examiner

Primary Examiner—Archene Turner
(74) Attorney, Agent, or Firm—William L. Krayer

(57) ABSTRACT

Chain parts and other steel articles are provided with hard, wear-resistant carbide coatings by tumbling them in a heated retort with a particulate mix which includes a source of vanadium and/or niobium. The steel substrate comprises a steel having at least 0.2% carbon, preferably 0.7–1.2%. Where the chromium content of the steel is 4–12%, preferably 4–8%, the chemical deposition process includes drawing a small amount of chromium from the steel substrate into the vanadium or niobium carbide coating, where it is distributed substantially homogeneously, helping to provide adhesion strength to the coating.

8 Claims, 3 Drawing Sheets

HARD STEEL ARTICLES

RELATED APPLICATIONS

This application is a division of application Ser. No. 09/891,703 filed Jun. 26, 2001, which was based upon and claims the full benefit of three Provisional patent applications: (1) Ser. No. 60/214,965 filed Jun. 29, 2000 bearing the title "Rotary Retort Pack Method for Generating a Vanadium Carbide Layer on Small Parts," (2) S No. 60/215,050 filed Jun. 29, 2000 bearing the title "Steel Composition for Use in Making Vanadium Carbide Coated Pins," and (3) Ser. No. 60/215,129 filed Jun. 29, 2000 bearing the title "Vanadium Carbide Coated Steel Pins for Chain and Method".

TECHNICAL FIELD

Chemical deposition effected by a tumbling action in a sealed retort is used to form hard, wear-resistant vanadium or niobium carbide (or both) coatings on steel articles such as chain pins. Carbide coated articles are claimed as well as a novel substrate steel and the method of forming the coatings.

BACKGROUND OF THE INVENTION

This invention is concerned most particularly with two types of chains—traditional roller chains and so-called silent chains. Both roller chains and silent chains use pins as important components.

In roller chains, the pins are free to rotate in hardened bushings; in silent chains, the cylindrical pins bear directly against the inside link apertures and are press fitted into outside guide links. The joint of the silent chain consists of the pins that rotate relative to the non-guide row links of the chain. The silent chain uses a series of links that are interlaced—that is, the inside links are press fitted onto the pins; inside links in the same row of the chain, and outside links in the adjacent or non-guide row, are interlaced with the links in the links in the guide row. See the description, for example, in FIG. 4 of Kozakura et al U.S. Pat. No. 6,068,568. Generally, the contact stress between the pin and the bushing in a roller chain will be lower than that of the contact stress between the pin and the link apertures of a silent chain, leading to the general observation that roller chains tend to have better wear characteristics than silent chains. This invention is therefore aimed primarily at improving the wear characteristics of silent chains, but is applicable to both types of chains, and to any steel parts, in chains or otherwise, subject to wear.

An example of pretreatment of a substrate to improve the application of a hard coating may be found in Hale's U.S. Pat. No. 4,608,098. A chemical vapor deposition process is described in Sarin et al U.S. Pat. No. 4,957,780. FeV is employed as a carbide-forming material by Arai et al U.S. Pat. No. 4,400,224. Vanadium carbide coatings have been placed on small steel parts in the past, but generally by a salt bath procedure such as is disclosed in the U.S. Pat. No. 4,400,224 patent and/or Arai et al U.S. Pat. No. 4,778,540. See also Arai et al U.S. Pat. Nos. 4,686,117, 4,786,526, 4,844,949, and 4,892,759, proposing a fluidized bed. A fluidized bed is also proposed by Lennartz in U.S. Pat. No. 5,498,442. Pins having a hard chromium carbide layer can be made by depositing the chromium from FeCr powder surrounding the pin surface, at 970 degrees C. The chromium diffuses from the powder and deposits on the pin surface, where it draws carbon from the substrate to form the carbide. Substrate steels having low carbon contents are not useful for this purpose, and accordingly it is necessary to carburize the pins, adding to the expense of the procedure. Nevertheless, such pins operate satisfactorily in roller chains, where the pins do not experience as much stress as those used in silent chains.

Chromium carbide coatings applied by chemical deposition have been tried on silent chain pins, but, under the higher surface stress of the silent chain, microbits of the hard coating spalled from the surface can add to and accelerate wear of the exposed substrate, which has a significantly lower hardness than the bits. In roller chains, the pin can wear completely through the bushing with the aid of loose chromium carbide particles. The importance of the adhesion layer, which bonds the coating to the substrate, is thus illustrated. A general observation may be made also that good adherence of the hard coating is considerably more difficult to achieve for vanadium carbide coatings than for chromium carbide coatings.

Chromium improves the adhesion of vanadium carbide coating to the substrate steel by forming a diffusion bond. This effect can be achieved by using ferro-chromium powder or elemental chromium powder in a chromium deposition process. But the use of ferro-chromium and elemental chromium powders is frequently foreclosed or inhibited by environmental regulation.

The composition of the pin substrate steel has significant effects on vanadium coated steel pins. We have found that appropriate carbon content of the substrate steel can ensure the thickness of the coating and impart strength and hardness, and appropriate chromium content in the substrate steel is important for good adhesion of the coating to the substrate steel pins. Various steels having moderate chromium levels have been disclosed in the patent literature for various purposes. See, for example, the U.S. Patents to Sattler U.S. Pat. No. 1,773,793, Corning U.S. Pat. No. 1,496,979, Nagumo et al U.S. Pat. No. 3,907,553, Philip et al U.S. Pat. No. 3,901,690, DeSouza U.S. Pat. No. 4,224,060, Kato et al U.S. Pat. No. 4,842,818, Arata et al U.S. Pat. No. 4,902,473, Hamada et al U.S. Pat. No. 5,013,525, and Fukushima U.S. Pat. No. 5,944,920. But no commercially available steel has been found to meet the preferred carbon and chromium specifications. Commercially available steels having the desired chromium contents have a very low carbon content, requiring that the pins and other parts or articles to be coated have to be carburized to a higher carbon level prior to the coating process, which increases the cost of the final products and reduces statistical quality performance because of the variations introduced by the carburizing process. Also the commercially available candidate steels tend to include far more molybdenum than necessary for our purposes, which unnecessarily increases the cost of the substrate steel and the desired articles made from it such as chain pins. The overall cost of the coated pin can be further reduced by lowering or eliminating this costly element in the steel. Our invention therefore includes a novel steel composition.

SUMMARY OF THE INVENTION

We have invented a process for the formation of a hard surface on steel articles, particularly on small parts such as pins used in chains. We employ a rotary, or tumbling, contact diffusion process in a sealed vessel to form a vanadium carbide, niobium carbide, or mixed vanadium/niobium carbide coating on the steel article. Our rotary contact diffusion process is a chemical deposition process carried out with the aid of a powder mixture (pack), in which steel articles such as chain pins are immersed or mixed, containing a particulate vanadium, niobium or mixed vanadium/niobium source, preferably in the form of FeV and/or FeNb, and a halide catalyst, preferably iron chloride. When the mixture in a sealed rotating or tumbling retort or other vessel is heated to the temperature range of 1600–2000° F., preferably 1700–1900° F., the catalyst reacts with the vanadium and/or niobium to produce vanadium and/or niobium chloride (halide) that diffuses in the pack and is transferred, assisted by the tumbling action imparted by the rotation or rocking of the vessel, to the surface of the steel article. The vanadium and/or niobium, as strong carbide-forming elements, draws carbon from the substrate steel to form a carbide layer with a hardness of over HV2000. The reactions that take place in the retort can be expressed as:

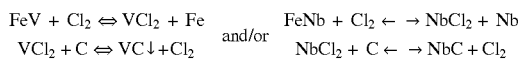

Succinctly, our invention involves depositing vanadium and/or niobium on the surface of the steel article, in the form of a halide, by chemical deposition effected by tumbling. The halide is transformed to vanadium and/or niobium carbide on the surface of the steel article, the carbon for displacing the halide and combining with the vanadium and/or niobium being diffused from the steel substrate. Accordingly, we prefer the carbon content of the steel be in the range of 0.7% to 1.2% by weight.

We also prefer a chromium content in the substrate steel of 4% to 8% by weight. Chromium improves the adhesion of the vanadium or niobium carbide coating to the substrate steel by forming a diffusion bond. But too much chromium in the substrate steel may promote ferrite stability and tend to inhibit the formation of a fully martensitic structure during post-heat treating. Accordingly, we use chromium contents in the steel lower than those of many stainless steels. More generally, we have found that chromium contents in the range of 4% to 12% may be used in our process, although 4–8% is preferred, and 5–6% is most preferred. Chromium contents higher than 12% or lower than 4% may be used where the adhesion bonding is not particularly useful.

We have found that, not only does carbon migrate to displace the halide from newly deposited vanadium or niobium halide, but chromium also migrates from the substrate steel to the coating, forming chromium carbide, which is distributed throughout the vanadium and/or niobium carbide coating. This substantially homogeneous dispersion of chromium carbide throughout the vanadium/niobium carbide coating is unique in our experience and contrasts to the less desirable substantially stratified result when a source of chromium is mixed with a vanadium or niobium source in the powder pack.

Vanadium and niobium are in Group 5 of the Periodic Table of the Elements in the 18-group classification designated and recommended by the International Union of Pure and Applied Chemistry. Since niobium has an atomic number of 41, we intend for the phrase "Group 5 metal having an atomic number no greater than 41" as used herein to mean vanadium and niobium.

Accordingly, our invention includes a method of forming a hard coating on a steel substrate having a composition including 0.7% to 1.2% carbon and from 4% to 12% chromium comprising applying at least one Group 5 metal having an atomic number no greater than 41 to the surface of the steel substrate by chemical deposition effected by tumbling at a temperature of 1600° F. to 2000° F. The Group 5 metal source is preferably FeV or FeNb. In addition to the Group 5 metal source, a chromium source may also be used in the chemical deposition process, but the amount should be such that not more than 5% of the resultant metal carbide coating is chromium carbide originating from the particulate mix.

Other, substantially inert, particulates, such as aluminum oxide, may be included in the particulate mix, preferably in amounts no greater than 50% by weight of the total mix.

In the chemical deposition process, a halide catalyst is used. We prefer to use a chloride, and particularly $FeCl_3$, as the catalyst, but ammonium chloride, niobium chloride, and vanadium chloride are also particularly useful forms. A small amount of halide from the catalyst is believed to combine temporarily with the Group 5 metal (and the chromium metal, if any is present in the particulate) and is released at the article surface when it is displaced by carbon drawn from the steel article. The halide is therefore arguably an activator rather than a catalyst. We do not intend to be bound by any one of such distinctions in the theory of the effect of the halide, but have adopted the term catalyst as a matter of convenience and employ it throughout to imply either function of the halide or any other theory of its function.

In a more preferred aspect, our invention includes a method of making a wear-resistant steel article comprising forming the article from steel having a carbon content of 0.9% to 1.1% by weight and a chromium content of 4% to 8%, most preferably 5–6%, by weight, and forming Group 5 metal carbide on the surface of the article by chemical deposition of the Group 5 metal thereon. In our preferred method of chemical deposition, the incipient wear-resistant steel article is tumbled in a vessel, preferably by rotation of the vessel, containing a particulate mix of a source of Group 5 metal, preferably vanadium, and, after a period of at least 60 minutes at a temperature of 1600–2000° F., preferably 1700–1900° F., the article is gradually cooled and separated from the particulate mix.

While we may use a variety of steels having carbon and chromium contents as stated above, our most preferred substrate is a steel having a composition, by weight, as follows: carbon: 0.9 to 1.1%; chromium: 5 to 6%; manganese: 0.25–0.45; silicon: 0.25 to 0.55%; molybdenum 0.2 to 0.55%; phosphorous 0.03% maximum; sulfur:0.03% maximum, and aluminum: 0.05% maximum. More generally, our preferred steel is

| C | Cr | Mn | Si | Mo | P | S | Al |
|---|---|---|---|---|---|---|---|
| 0.7–1.2 | 4–8 | 0.25–0.45 | 0.25–0.55 | 0.2–0.55 | 0.03 max | 0.03 max | 0.05 max |

The balance comprises iron and may include small amounts of other elements and metals commonly used or found in steel. This steel composition is called hereafter Steel Composition A.

After the carbide coating is formed, the coated articles have a novel structure comprising a coating and a core, the coating comprising vanadium carbide and/or niobium carbide, the core comprising Steel Composition A. In addition to the vanadium and/or niobium carbide, where the steel substrate contains at least 4% chromium by weight, the coating composition includes 1% to 3% percent chromium carbide distributed substantially homogeneously throughout.

Our invention further includes a post-heat treatment wherein, after cooling and separation from the particulate mix, the coated article is subjected to at least austenitizing temperature and quenched in a conventional manner to harden the core, preferably achieving a final core hardness Rc44-56; the article may then be polished in a conventional manner. However, the coated article is novel without the post-heat hardening process, and is useful, for example, for the corrosion resistance imparted by the coating.

In another aspect, our invention includes a method of forming a hard coating on a steel article. The method utilizes contact of the article, preferably by tumbling the article, with a particulate source of Group 5 metal having an atomic number no greater than 41 in a heated vessel in the presence of a halide catalyst. The tumbling may be accomplished by rotating the vessel and its contents. The steel should have a carbon content of at least 0.2% by weight. The article is preferably mixed in the particulate source of Group 5 metal and catalyst, and the vessel is rotated to mix its contents and provide more or less continuous contact of the article with the particulate materials while the temperature within the vessel is maintained at 1600–2000° F. (870–1200° C.), preferably 1700–1900° F., for a time sufficient to form a coating of Group 5 metal carbide of the desired thickness on the article, having a hardness of at least HV2000.

Preferably, air is withdrawn and the process is conducted in the sealed vessel in the substantial absence of air, but we prefer to fill the void with an inert gas, preferably argon or nitrogen, rather than use a vacuum, which requires greater vigilance against leaks. During the heating and rotation of the vessel, the ferrovanadium and/or ferroniobium, or other source of Group 5 metal, is caused to dissociate, providing Group 5 metal which is deposited at the surface of the article in the form of a halide. Carbon is drawn from the steel surface of the article to displace the halide, which then reverts to the particulate mix to combine with additional group 5 metal from the source. Only a small percentage of the Group 5 metal source, estimated at 0.5 to 2%, of the metal in the metal source, is consumed in the process to provide a commonly desired coating thickness of 10 to 20 microns.

Our method invention includes two or more uses of the particulate mix. That is, after the article or articles are treated to form a hard coating as described above, the particulate mix and the aritcles are separated, and the particulate mix may be returned for re-use in the vessel (or a different one) to be heated again in the presence of another article or articles to be coated. The particulate mix need not be replenished through several iterations, but our invention includes the possibility of replenishing the Group 5 metal source and/or the catalyst while the bulk (at least 50%) of the particulate mix in successive uses may comprise material having been used before for the purpose. Since generally less than 2% of the vanadium source is consumed in a single use, and since the halide displaced from the Group 5 metal at the surface returns to the particulate mix to combine with additional Group 5 metal, our invention includes the use of the same batch of particulates for at least two batches of articles, and additional batches as the economics of the facility may suggest. Generally at least five uses will be quite practical. Preferably, for any given use, the ratio of Group 5 metal in the Group 5 metal source to the articles will not be below 1:2 by weight, and is preferably 1:1 to 2:1 by weight. There is no theoretical reason why the ratio cannot be considerably higher than 2:1—say, 10:1, but such a ratio would not normally be economically acceptable.

DETAILED DESCRIPTION OF THE INVENTION

Figure 1A:
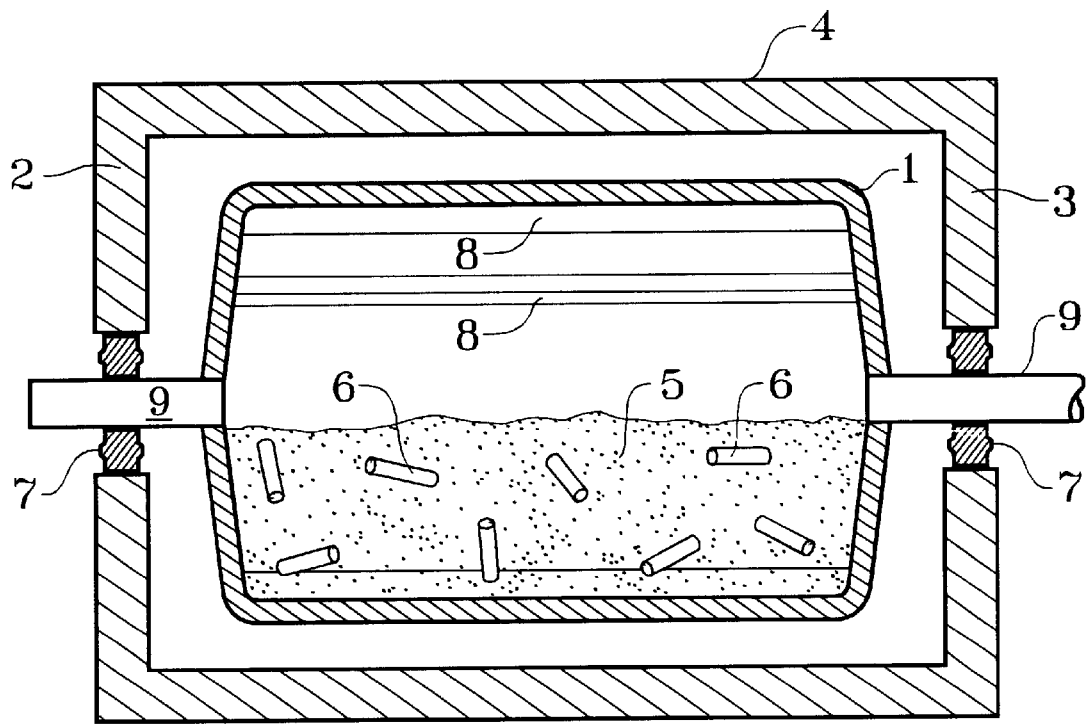
FIG. 1A is a longitudinal sectional view of a preferred rotating retort containing a vanadium source and prepared for forming a coating on selected articles.
Figure 1B:
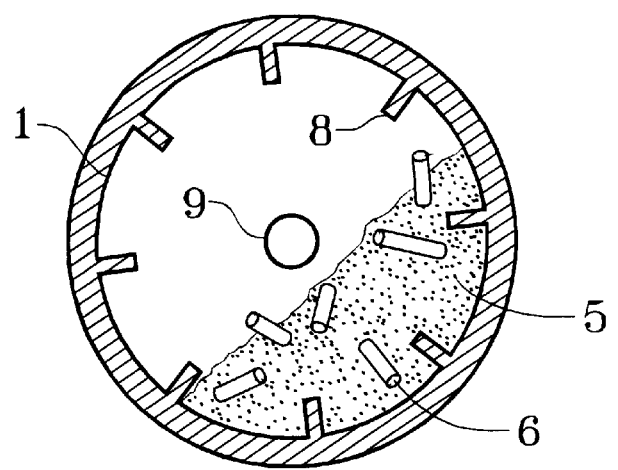
FIG. 1B is an end section of the rotating retort also showing the contents.

Referring now to FIG. 1A, the method is preferably implemented in a rotary container 1 having a shaft 9 held rotatably in walls 2 and 3 of furnace 4 by bushings 7 and sealed. A motor not shown will rotate the container 1 at a desired speed while the furnace 4 is maintained at a temperature of 1600–2000° F., preferably 1700–1900° F. Inside container 1 is a particulate mix 5 and at least one steel article, in this case steel chain pins 6, to be coated. In this exemplary illustration, the particulate mix 5 comprises ferrovanadium having a particle size of 0.8 to 3 mm, and includes about 1% of the selected halide catalyst, $FeCl_3$. FIG. 1B is an end section of the container, illustrating how the contents are mixed, preferably with the aid of baffles 8, during rotation of the container 1. The particulate mix and the article(s) to be coated are substantially constantly contacted during the rotation of the container 1, causing the vanadium carbide to be formed on the surface of the steel chain pins 6.

The halide catalyst may be used in any effective amount, but we prefer about 0.6% to 3% by weight of the Group 5 metal source. The vessel, retort, or container 1 may be rocked or otherwise agitated rather than rotated.

Our invention includes a steel article coated with a carbide of a Group 5 metal having an atomic number no greater than 41. A preferred article will have a core of steel comprising 0.8–1.2% carbon (most preferably 0.9–1.1%) and 4%–8% chromium (most preferably 5–6%) and a hard coating comprising vanadium carbide, most preferably vanadium carbide including 1% to 3% chromium carbide distributed homogeneously throughout the coating. All percentages herein are by weight.

Figure 2:
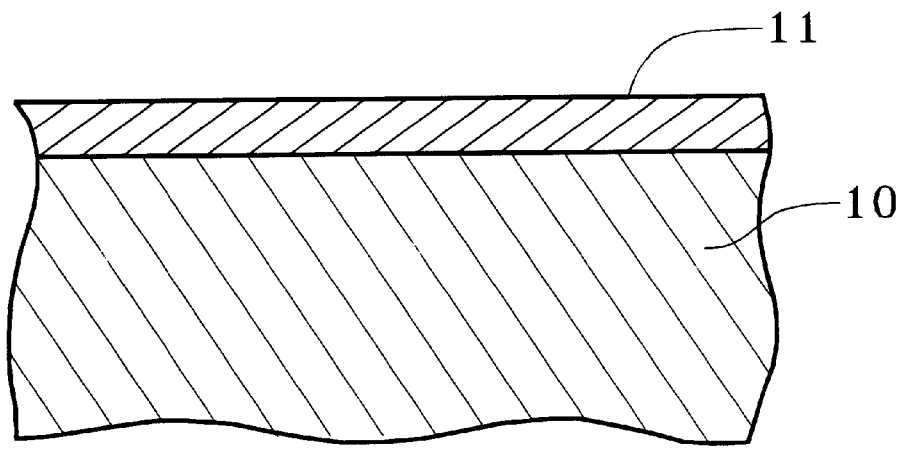
FIG. 2 is an idealized section of a pin coated with vanadium carbide by our process.

In FIG. 2, a silent chain pin finished by our method is shown in section. The pin comprises core 10 and a hard outer coating 11. The core 10 is steel of Steel Composition A, and the outer coating 11 is a coating comprising 97–99% vanadium and/or niobium carbide and 1–3% chromium carbide distributed homogeneously throughout. During the coating process, the Group 5 metal is deposited on the article surface in the form of a halide, and carbon is drawn from the surface of the steel to combine with the Group 5 metal and displace the halide. However, it is not essential for our process to use the preferred steel substrate having the above prescribed amounts of carbon and chromium. Our tumbling contact process may be used beneficially on any steel having at least 0.2% and up to 2% carbon by weight.

Figure 3:
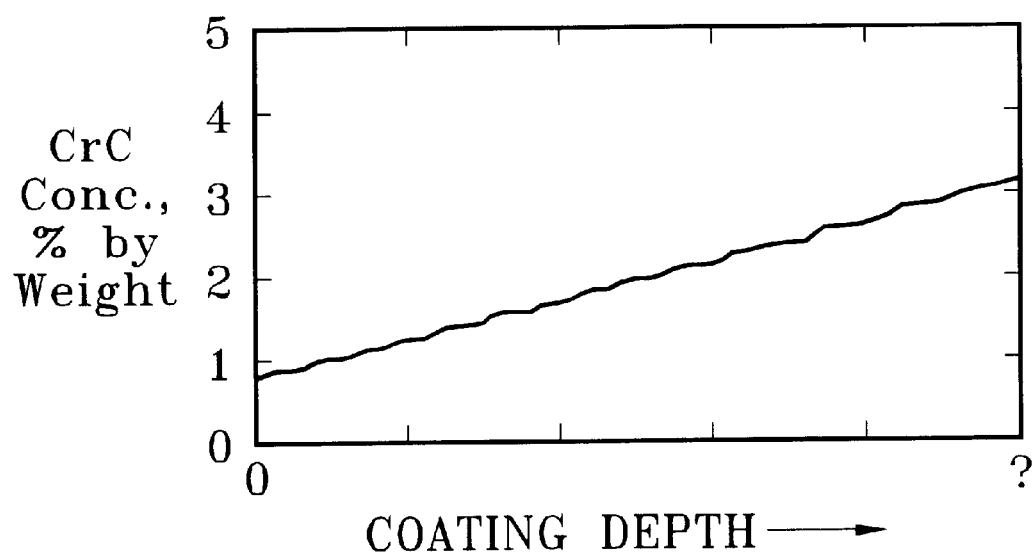
FIG. 3 is an idealized plot of chromium carbide against depth from the surface of a pin coated by our process.

FIG. 3 is an idealized plot of chromium carbide content against coating depth for a coating 15 microns thick—that is, distance from the coating surface on a pin treated by our process. In this typical case, the steel had a carbon concentration of 1.0% and a chromium concentration of 5.5%. It will be seen that there is a gradient of chromium carbide homogeneously dispersed and ranging in concentration from about 1% near the surface of the coating to about 3% in the lower region of the coating. As discussed elsewhere herein, the chromium carbide is formed from chromium and carbon present in the steel prior to the use of our process.

Figure 4:
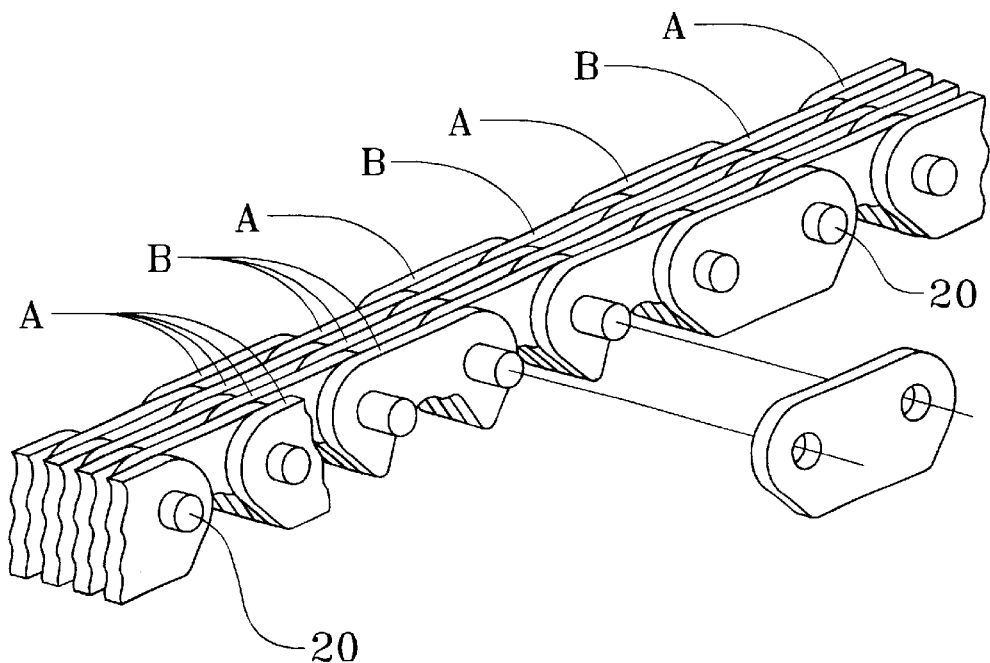
FIG. 4 shows a portion of a silent chain generally of a prior art design but including pins which may be coated by our process.

In FIG. 4, a portion of a typical silent chain is shown, comprising sets of plates A and B, each having two holes for pins 20. In this configuration, parallel sets A of four plates and parallel sets B of three plates may be shaped to accommodate sprockets or otherwise to engage a force-delivering device not shown. Some of the plates A or B may articulate on the pins 20 and others may be secured to them so as not to rotate on the pins, depending on the design of the chain. In either event, whether there is articulation or not at the plate/pin interface, significant stress and wear may be engendered at the interface of the pins and the plates.

A comparison of chain pins made by our process to more conventional pins showed that the hard coating on our pins did not flake off the pin when it was bent in a vise, whereas pins made by a conventional process flaked off. This is generally taken to mean that when the coating of our pin is abraded, it will nevertheless adhere more tenaciously than the coating of the conventional pin. As indicated above, flaking or spalling of hard coatings can be very destructive to worn contact surfaces of chain parts.

What is claimed is:

1. An article comprising a hard coating comprising at least one Group 5 metal carbide and including 1–3% chromium carbide interspersed substantially homogeneously therein, and a core of steel including 0.7% to 1.2% by weight carbon and 4–8% chromium.

2. An article of claim 1 wherein said article is a chain pin having a core hardness of Rc44-56.

3. An article of claim 1 having a surface hardness of at least HV2000.

4. An article of claim 1 wherein said article is a chain pin.

5. An article of claim 1 wherein said core of steel comprises, weight percent:

| C | Cr | Mn | Si | Mo | P | S | Al |
|---|---|---|---|---|---|---|---|
| 0.7–1.2 | 4–8 | 0.25–0.45 | 0.25–0.55 | 0.2–0.55 | 0.03 max | 0.03 max | 0.05 max. |

6. An article of claim 5 wherein said article is a chain pin.

7. An article of claim 6 wherein said chain pin has a core hardness of Rc44-56.

8. An article of claim 7 wherein said chain pin has a surface hardness of at least HV2000.

* * * * *